United States Patent
Huber

(10) Patent No.: US 6,945,373 B2
(45) Date of Patent: Sep. 20, 2005

(54) POWER UNIT MOUNTING FOR MOTOR VEHICLES WITH COLLISION SEPARATION

(75) Inventor: Dennis Huber, Graz (AT)

(73) Assignee: Magna Steyr Fahrzeugtechnik AG & Co. KG, Graz (AT)

(*) Notice: Subject to any disclaimer, the term of this patent is extended or adjusted under 35 U.S.C. 154(b) by 0 days.

(21) Appl. No.: 10/468,420

(22) PCT Filed: Feb. 19, 2002

(86) PCT No.: PCT/AT02/00055

§ 371 (c)(1),
(2), (4) Date: Feb. 4, 2004

(87) PCT Pub. No.: WO02/066278

PCT Pub. Date: Aug. 29, 2002

(65) Prior Publication Data

US 2004/0130078 A1 Jul. 8, 2004

(30) Foreign Application Priority Data

Feb. 19, 2001 (AT) ..................................... 130/2001 U

(51) Int. Cl.[7] .................................................. B60K 5/12
(52) U.S. Cl. ........................................ 188/375; 188/371
(58) Field of Search ................................. 188/371–378

(56) References Cited

U.S. PATENT DOCUMENTS 3,779,591 A * 12/1973 Rands ......................... 293/133
3,882,970 A * 5/1975 Newman, Jr. ............... 188/375

FOREIGN PATENT DOCUMENTS

WO         WO98/9863      * 12/1998

* cited by examiner

Primary Examiner—Matthew C. Graham
(74) Attorney, Agent, or Firm—Bachman & LaPointe, P.C.

(57) ABSTRACT

A mounting for a power unit for motor vehicles, comprises a support and a support plate fixed thereto, which may be detached in the case of a collision, whereby the support plate is connected to the support in a number of places. A power unit mounting may be achieved which guarantees a steady deceleration, whereby a separating device is provided, which separates the support plate from the support. The separating device can be a part of the support plate or fixed thereto and is forced between support plate and support in the case of a collision.

12 Claims, 5 Drawing Sheets

POWER UNIT MOUNTING FOR MOTOR VEHICLES WITH COLLISION SEPARATION

BACKGROUND OF THE INVENTION

The invention relates to a support for an assembly for motor vehicles, comprising a crossbeam which is fastened to the body of the assembly, and a supporting plate which is fastened on said crossbeam in a manner enabling it to be detached in the event of a collision, on which the assembly is supported, the supporting plate being connected to the crossbeam at a number of points, and at least part of the assembly being situated upstream of the support in the direction of travel, and comprising a separating device which separates the supporting plate from the crossbeam in the event of a collision.

An assembly is understood to be the drive train or part of it, in particular the engine/transmission block and, if appropriate, an adjoining differential or power take-off gear. These assemblies are virtually all accommodated nowadays in the front end of the vehicle. The crossbeam is a crossrail which connects the longitudinal crossbeams of the vehicle body or of the vehicle frame, depending on the manner of construction of the vehicle. The assembly is supported in respect of forces and moments at three points as a rule, all three being suitable for the support according to the invention, but in particular the rear one.

In the event of a head-on collision, first of all the front end is deformed over a certain deformation distance, decelerating the part of the vehicle body which lies behind it; this part is the cell in which the passengers sit. When the deformation distance has been covered, the assembly strikes against the obstacle. The assembly itself is virtually impossible to deform, and so the deceleration rises very sharply. If the assembly is connected fixedly to the vehicle body, the deceleration of the passengers may reach lethal values. The prior art therefore ensures that the assembly is released from its fastening to the vehicle and is pushed to the rear with further consumption of energy. Moreover, measures still have to be taken so that the assembly is not pushed into the cell, but rather some of it is initially pushed under the cell.

A construction of this type is disclosed in DE 43 18 254 A1. A supporting bearing which can be destroyed in the event of a collision is provided for this. If said supporting bearing is destroyed, the assembly can pivot away downward. The supporting bearing has to be sufficiently strong for it to be able to absorb, in all driving conditions, the forces which are exerted by the assembly and, in the event of a collision, the forces which occur in the first phase—in which only the front end is deformed. One drawback is that the destruction of such a strong supporting bearing requires considerable forces, which causes a brief, but nevertheless steep rise in the deceleration. If the supporting bearing is then destroyed, the further movement of the assembly takes place virtually without any consumption of energy.

It is known from practice to provide, between the supporting bearing and crossbeam, a supporting plate which is connected to the crossbeam and is connected only in a pointwise manner to the crossbeam, by means of bolts, rivets or preferably welding points, so that these connections tear in the event of a collision. However, even this solution is not satisfactory because there is still a discrepancy between the fatigue strengths and force absorption of the connection in the first phase of a collision and the force which is required for tearing-off purposes and which causes deceleration peaks.

Finally, DE 196 36 167 discloses an assembly separation which is caused by a head-on collision and is triggered by a collision with the front bumper. The assembly sits, obviously fixedly, on a auxiliary frame which is connected to the longitudinal crossbeams of the frame via "bearing shafts" which lie longitudinally. In the event of a collision, at least one piston rod, which is connected to the bumper via an elastic element, is displaced to the rear, in which case it pulls the bearing shafts connected to it to the rear. As a result, the connection between the auxiliary frame and the longitudinal crossbeam of the frame is released without significant effort and the assembly should fall to the ground. However, no more mechanical energy is destroyed in the process, and so the existing problem cannot be solved with this.

It is therefore the object of the invention to provide an assembly support in which this discrepancy does not exist, which, in other words, ensures a continuous deceleration profile over as long a distance as possible. Since, however, the deceleration profile is also affected by the mass and deformation work of further components which can be changed to only a very limited extent, the assembly support is intended even to permit modeling of the force profile over the deformation distance in respect of an overall constant deceleration.

SUMMARY OF THE INVENTION

The object is achieved according to the invention, wherein a flexible element is provided between the supporting plate and assembly, the separating device only coming into effect if the flexible element has yielded to a certain extent, there being two preferred possibilities for the provision of the separating device: either it is part of the supporting plate or is fastened thereto, and, in the event of a collision, is pushed between the supporting plate and crossbeam by the assembly; or it is part of the assembly or is fastened thereto and, in the event of a collision, penetrates between the supporting plate and the crossbeam. Which of the two is to be preferred depends on the design circumstances of the particular vehicle.

The flexible element may be an elastic rubber bearing or a deformable intermediate plate or both together. The extent of the yielding is determined by the distance between the separating device and the connection or between the element acting upon the separating device and the separating device. This enables the deformations situated in front of it to be set precisely and the deceleration profile to be modeled. And the discrepancy between the maximum operating strength and reduced strength given an increased deformation distance in the event of a collision is eliminated.

The separating device has an active effect on the connection, but only when the deformation situated immediately in front of it has already taken place. The active effect means that a much smaller force is sufficient for separating purposes, but it has to act in the direction specified by a collision. Forces acting in other directions do not bring the separating device into effect.

The separating device can have an effect in a number of ways. If there are a plurality of fastening points one behind another in the longitudinal direction, the separating device can separate them in sequence, in a staggered manner, and thus use them for modeling the deceleration profile. However, the supporting plate may also be designed in such a manner that it becomes deformed after the first fastening point is separated, and thereby consumes work. The separating device may produce an upwardly acting force, which is particularly favorable for tearing open a welding point or for tearing off a bolt; however, it may also, or additionally, exert a horizontal force.

In order to produce a force which acts in a separating manner, in one advantageous development, either the separating plate is, on its side which faces the separating device, inclined upward at an acute angle, or the crossbeam, on its side which faces the separating device, is inclined downward at an acute angle. By means of their wedging action, the inclined surfaces produce the separating force component which tears open the closest welding points or screw bolts.

In order to exert a horizontal force and thus to sever a rivet or bolt, the separating device has a sharp-cornered edge at its end which penetrates between the supporting plate and the crossbeam, as a result of which it acts in the manner of a chisel which severs or cuts through a rivet or bolt transversely with respect to its axis.

In an embodiment which is particularly good in respect of manufacturing and effect, the supporting plate has, in order to form the separating device, a ramp which is inclined upward at an acute angle, followed by at least one bent-over section whose end which faces the crossbeam and the supporting plate forms a separating edge. The separating device is therefore integral with the supporting plate. In other words, the separating plate "tears itself" off from the crossbeam. Since the supporting plate is produced from sheet metal by punching and/or drawing, its shape can be precisely tailored in all details to a certain deformation and force profile. This is ideal for modeling the deceleration profile.

In a refinement, the ramp of the supporting plate has a stiffening bead as far as the first bent-over section and lateral incisions in the first bent-over section and the following, second bent-over section extends again over the entire width of the supporting plate. As a result, the transition from the supporting plate to the separating device can easily be bent, with the result that the separating device is rapidly fitted to the connection and the part forming the separating device itself is very stiff, thus enabling it to act simultaneously on a plurality of fastening points lying next to one another. This stiffness can be further increased by the second bent-over section having reinforcing ribs in the longitudinal direction. These ribs also contribute to the better introduction of force from the assembly to the separating device. The two bent-over sections may also be two adjoining zones of a bent-over section with relatively large radii of curvature.

BRIEF DESCRIPTION OF THE DRAWINGS

The invention will be described and explained below with reference to drawings, in which.

DETAILED DESCRIPTION

Figure 1A:
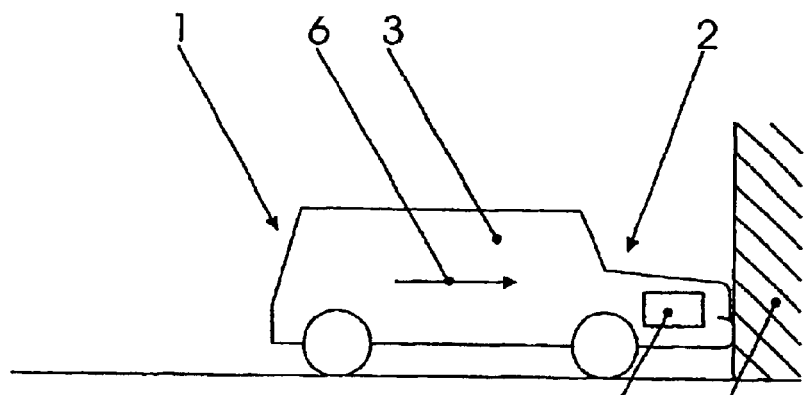
FIG. 1: shows, schematically, a collision in three phases a), b) and c)
Figure 1B:
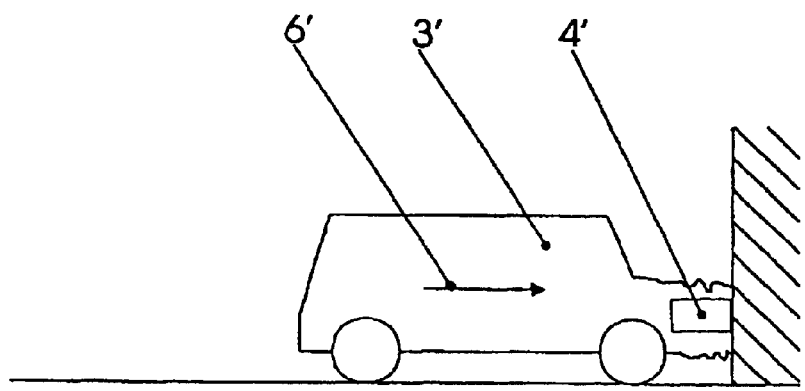
Figure 1C:
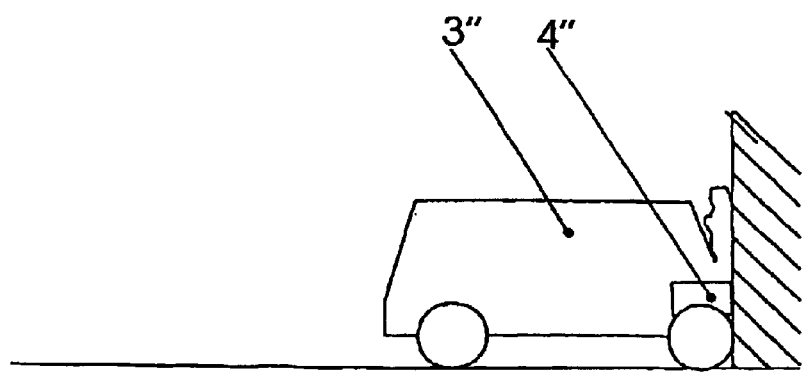

In FIG. 1, a motor vehicle is referred to in general by 1, its front end by 2 and its cell, which is the space in which the passengers are situated, by 3. An assembly is indicated in the front end 2 and is referred to by 4. In this case, it is the engine/transmission block. In FIG. 1a, the vehicle which is traveling at a certain speed (arrow 6), is illustrated at the moment in which it comes into contact at its frontmost point with a collision object, a fixed obstacle or another vehicle. This is the beginning of the collision. The front end 2 is first of all deformed until the assembly 4 has also reached the obstacle 5, as illustrated in FIG. 1b. Up to this point, the front end has been deformed with energy being consumed, the cell 3 of the vehicle having been decelerated. At the moment illustrated in FIG. 1b, if there were a fixed connection between the engine 4 and the vehicle 1, the deformation of the front end would come to a stop, since the assembly 4 itself is scarcely deformed at all, and the deceleration of the cell 3 would reach impermissibly high values. If, however, the assembly 4 is detached from its mount in the front end 2 and is displaced, consuming energy, with respect to the cell 3, which is still moving at the speed 6', the cell 3 gains a further deformation distance which causes the deceleration to rise less steeply. In an ideal case, it remains equal to the deceleration of the first phase in which only the front end 2 is deformed. FIG. 1c shows the end. The cell 3 has come to a standstill and the assembly 4 has been pushed into, or better under, the cell 3. For the present invention, what happens between the stages of FIG. 1b and FIG. 1c is of importance.

Figure 2:
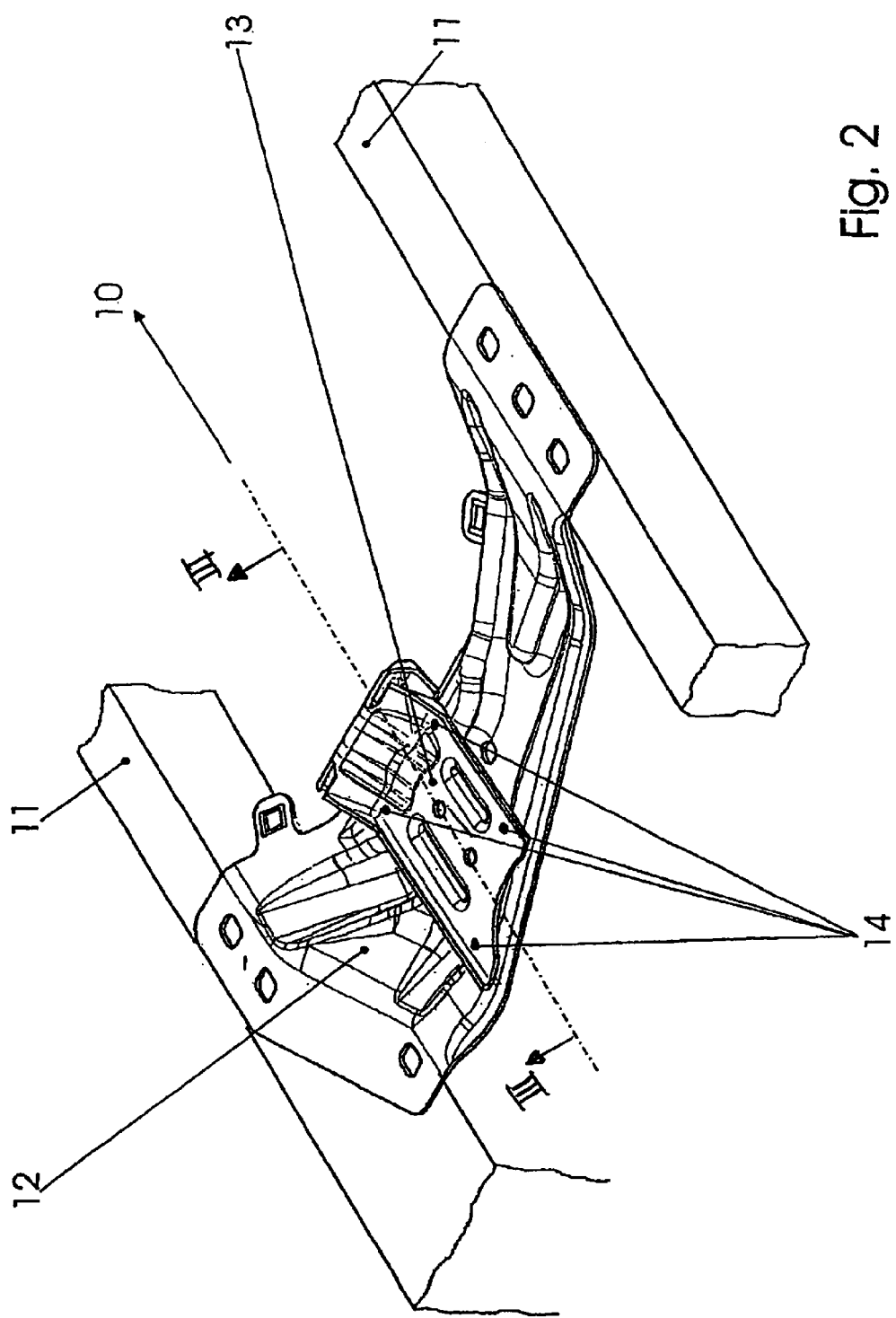
FIG. 2: shows, axonometrically, that part of a support according to the invention which is fixed on a vehicle.

FIG. 2 shows part of the front end 2, the direction of travel and direction of collision being indicated by the arrow 10. A crossbeam 12 is fastened, specifically welded or screwed on, as indicated, between the longitudinal crossbeams of the motor vehicle or between its frame, depending on the type of construction. This crossbeam 12 is a crossrail and a supporting plate 13 is fastened in a pointwise manner to it, for example by means of welding points 14. The crossbeam 12 is a correspondingly dimensioned and shaped sheet-metal punched part and the rear part of the assembly 4 is supported on the supporting plate 13 in a manner which is still to be described.

Figure 3:
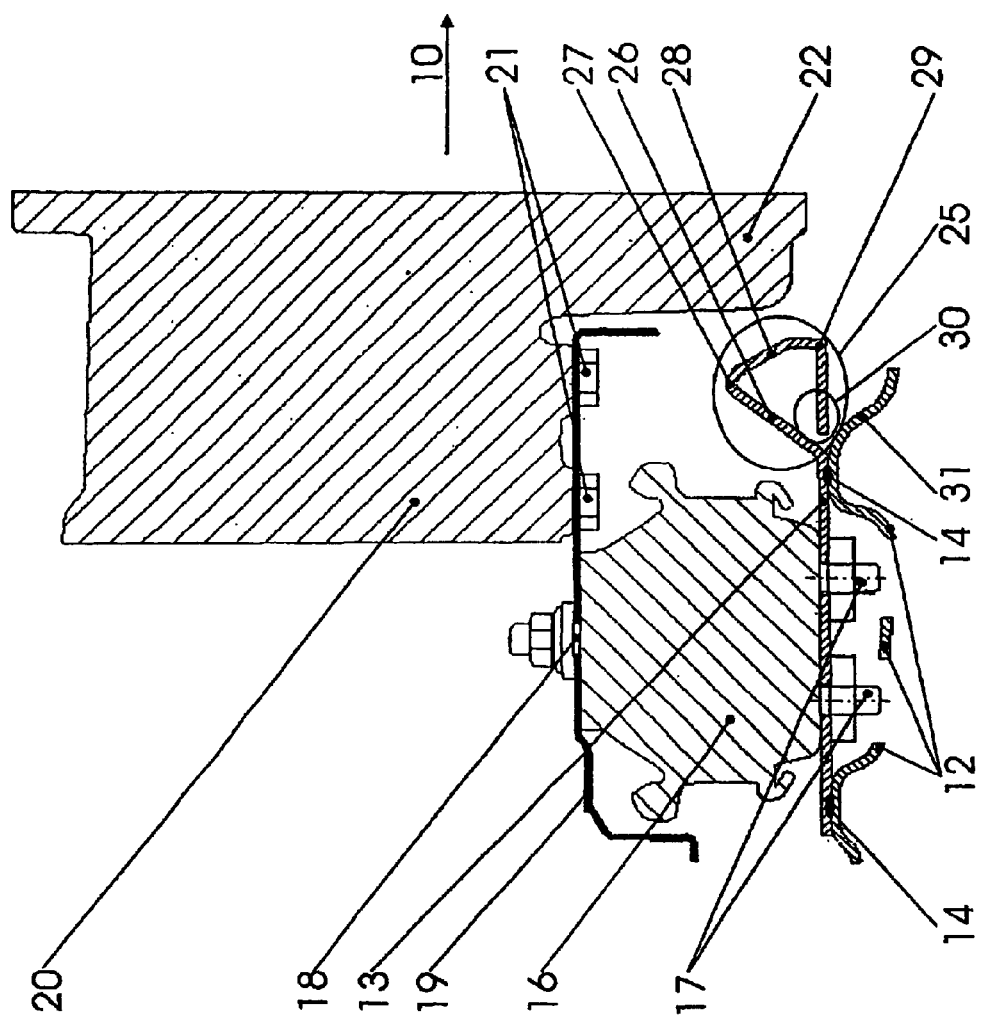
FIG. 3: shows a longitudinal section according to III—III in FIG. 2, FIG. 4: is as FIG. 3, but at a later stage.

This can be seen in FIG. 3. An engine bearing 16 is screwed on the supporting plate 13 by means of screws 17. The engine bearing 16 itself is of the usual type for such purposes (a rubber block or a hydraulic bearing) and it is therefore only illustrated in outline. Its upper part 18 which can be moved with respect to the fastening 17 is screwed to a connecting plate 19. This connecting plate 19 may also be deformable. The housing 20 of the assembly 4 sits on it and is fastened to it by means of bolts 21.

The housing 20 has a downwardly protruding part 22 upstream of the engine bearing 16 in the direction of travel 10. In the event of a collision, starting from the stage illustrated in FIG. 1b, the housing 20 is pushed rearward counter to the direction of travel 10. In the process, the engine bearing 16 is first of all deformed in such a manner that its upper part 18 is displaced horizontally to the rear with respect to the supporting plate 13 by the connecting plate 19. At this stage, the connection between the crossbeam 12 and supporting plate 13 still has to remain intact and undeformed, since it may well be a collision at a low speed which the vehicle has to survive without these parts being structurally damaged. During this displacement, the lower part 22 of the housing 20 approaches a separating device, which is initially referred to in general by 25.

In FIG. 3, the separating device 25 is formed integrally with the supporting plate 13, as part of the latter. The part which is connected to the crossbeam 12 is adjoined to the front first of all by a ramp 26 which is inclined upward at an acute angle, then by a first bent-over section 27 which is adjoined by the actual separating part 28 which is guided by a second bent-over section 29 as far as the separating edge 30. The crossbeam 12 has, on its side, which is inclined toward the separating edge 30, a part 31 which is inclined downward at an acute angle.

Figure 4:
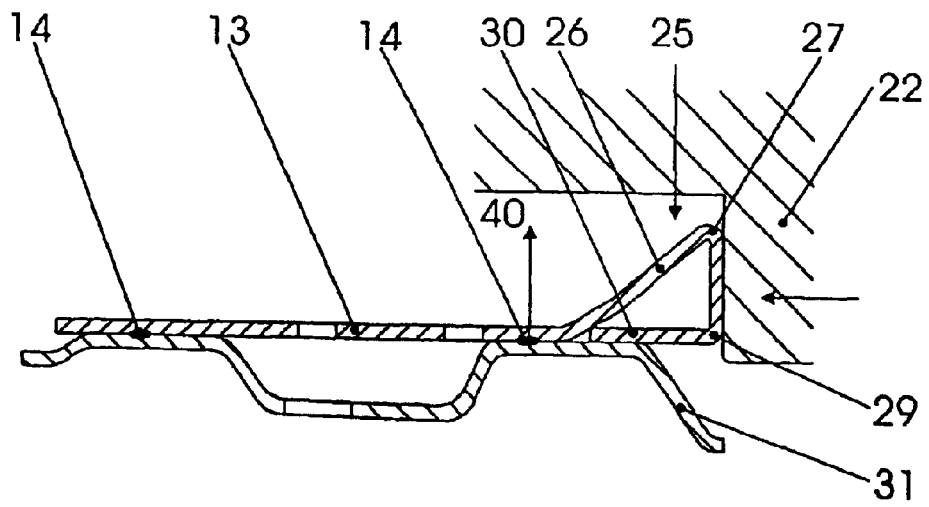

FIG. 4 shows the supporting plate 13 with its separating device 25 at the moment at which, after inner displacement of the engine bearing 16, the lower part 22 of the housing 20 is placed against the separating device 25. As a result, the separating part 28 is rammed, by distortion of the first bent-over section 27, into the between the ramp 26, supporting plate 13 and the downwardly inclined part 31 of the crossbeam 12. In the process, the wedging action produces an upwardly directed force (arrow 40) which first of all tears open the first welding point 14. The wedging action can be further reinforced by the fact that the separating edge 30 is sharp-cornered and therefore forms a cutting edge. It therefore additionally cuts into the welding point 14 or, if a bolt or a rivet is provided instead, cuts through them. The supporting plate 13 can now bent-over section back absorbing further deformation work until the rear welding point 14 tears off. This signifies uniform deceleration over a certain deformation distance.

Figure 5:
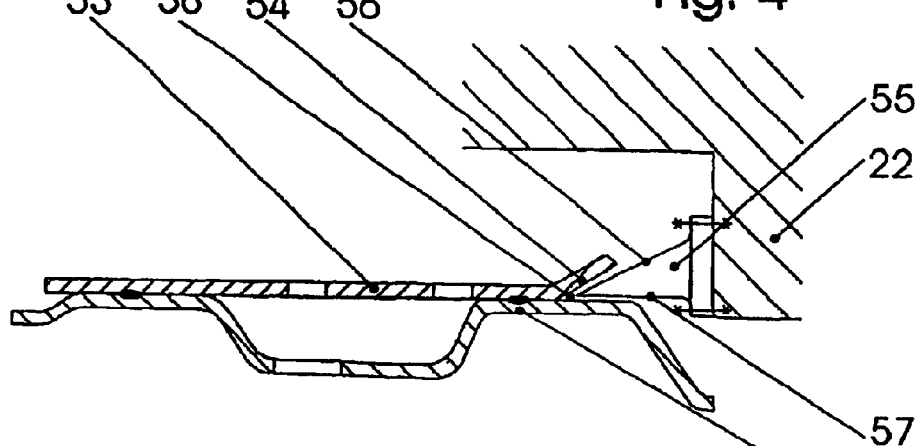
FIG. 5: is as FIG. 3, but in a first variant of a modification.

FIG. 5 shows a variant of FIG. 4 at the same stage of the collision, in a first modification: the supporting plate 53 here has an edge 54 which is inclined upward at an acute angle only over a small length. The separating device 55 is a wedge which is fastened to the lower part 22 of the housing 20 or is integral therewith. It has an upper wedge shoulder 56 which encloses an acute angle with an approximately horizontal floor surface 57. In the event of a collision, this wedge-shaped separating device 55 is pushed into the V-shaped gap 58 between the front end 54 of the supporting plate 53 and the crossbeam 12.

Figure 6:
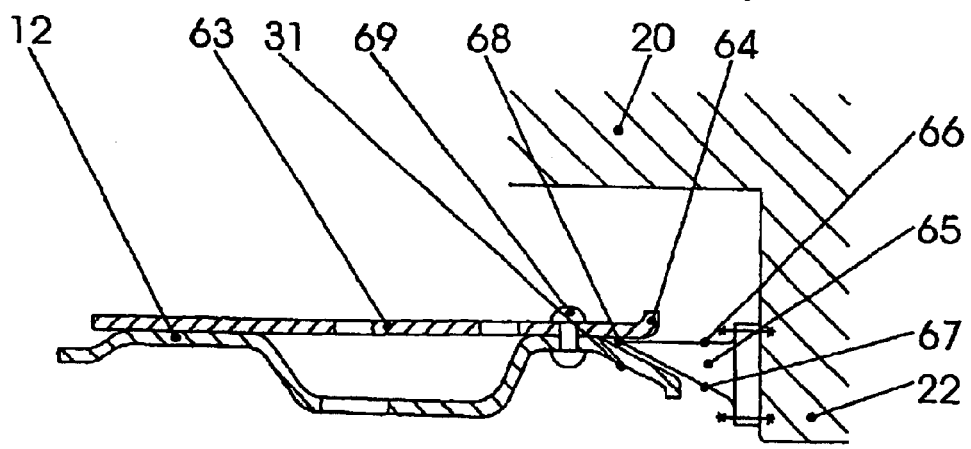
FIG. 6: is as FIG. 3, but in a second variant of the modification.

In the variant of FIG. 6, the separating device differs from that of FIG. 5 only by the fact that it has a lower wedge shoulder 67 and a horizontal top surface 66. The supporting plate 63 can be flat at its front end and for reinforcement purposes here only has a raised edge 64. In the event of a collision, the separating device 65 penetrates into the gap 68 between the supporting plate 63 and the crossbeam 12, in which case, in the exemplary embodiment shown here, it uses its wedge-shaped shoulder 67 to raise the part 22 of the housing and uses its cutting edge to accurately cut through the bolt or rivet 69. In certain installation situations, it may be desirable to raise the housing part 22 in order to ensure that the entire housing 20 of the assembly 4 can slide away over the supporting plate and the crossbeam without becoming hooked or getting stuck.

Figure 7:
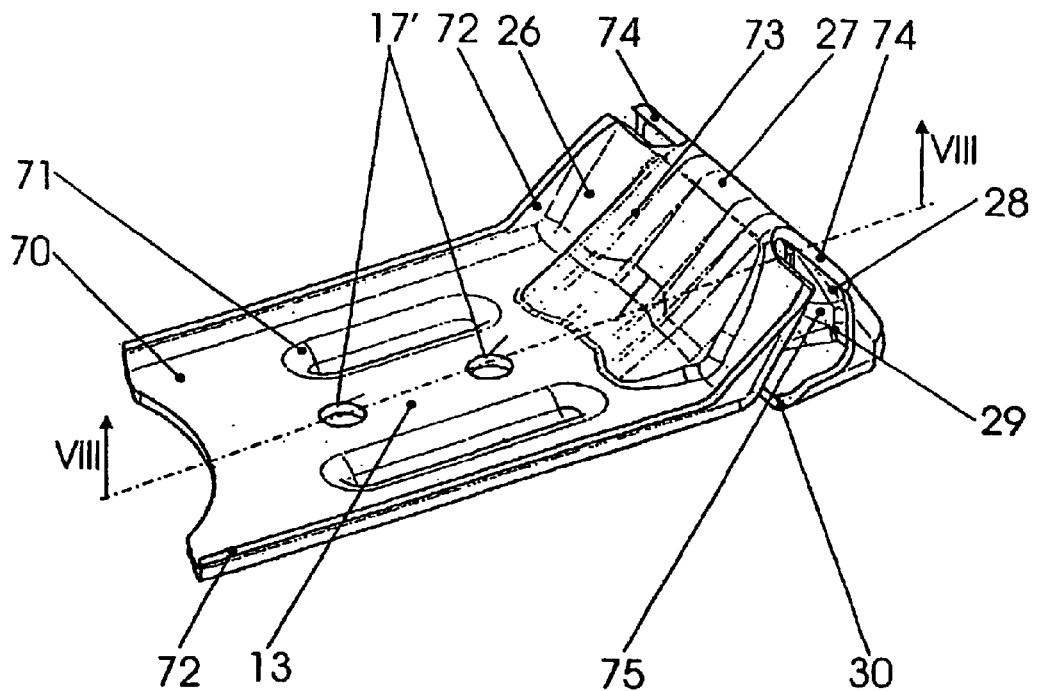
FIG. 7: shows a preferred detail of FIG. 2.
Figure 8:
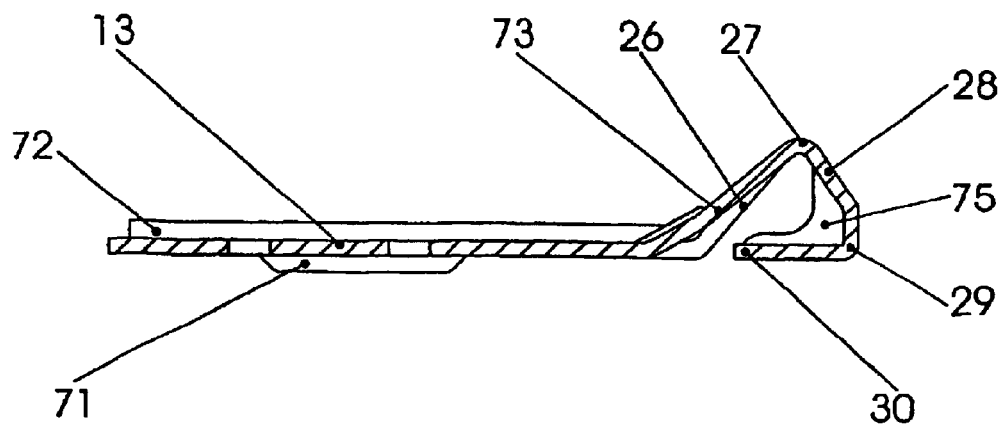
FIG. 8 shows the section VIII—VIII in FIG. 7.

FIGS. 7 and 8 show in detail the supporting plate of FIG. 3 in an optimum embodiment in terms of modeling the deceleration. The plate part 70 of the supporting plate 13 has two holes 17' in its axis of symmetry for the screws 17 for fastening the engine bearing 16, and, on both of their sides, a respective bead 71 for stiffening or increasing the deformation work, and laterally bent-up edges 72 which also reinforce the ramp 26. Furthermore, the ramp 26 has a stiffening bead 73 which likewise extends in the longitudinal direction and reaches as far as the first bent-over section 27. This is smaller than the supporting plate 13 because it has incisions 74 on both sides. As a result, easy and positionally correct folding in the first bent-over section 27 is possible, so that the separating edge 30 does not miss its target. The separating part 28 together with the second bent-over section 29 and the separating edge 30 is a structure which is stiffened by further reinforcing ribs 75. As a result, this part, which can be pivoted inward for separating purposes, cannot be deformed, with the result that the separating edge 30 comes into effect over the entire width of the supporting plate 13.

What is claimed is:

1. A support for an engine/transmission block assembly (4) for motor vehicles, comprising a crossbeam (12), which is fastened to the body of the engine/transmission block assembly, and a supporting plate (13), which is fastened on said crossbeam in a manner enabling it to be detached in the event of a collision, on which the engine/transmission block assembly (4) is supported, the supporting plate (13) being connected to the crossbeam (12) at a number of points (14), and at least part of the engine/transmission block assembly (4) being situated upstream of the support in the direction of travel (10), a separating device (25; 55; 65) separating the supporting plate (13) from the crossbeam (12) in the event of a collision, wherein the separating device is moved by the engine/transmission block assembly to separate the supporting plate from the cross beam when the collision is of sufficient magnitude.

2. The support as claimed in claim 1, wherein a flexible element (16, 19) is provided between the supporting plate (13) and the engine/transmission block assembly (4), and the separating device (25; 55; 65) only comes into effect when at least one of the flexible element (16, 19) and the supporting plate (16, 19) has yielded to a certain extent.

3. The support as claimed in claim 1, wherein the separating device (25) is integral with the supporting plate (13) or is fastened thereto and, in the event of a collision, is pushed between the supporting plate (13) and the crossbeam (12) by the engine/transmission block assembly (4).

4. The support as claimed in claim 1, wherein the separating device (55; 65) is integral with the engine/transmission block assembly (4) and, in the event of a collision, penetrates between the supporting plate (13) and the crossbeam (12).

5. The support as claimed in claim 1, wherein the supporting plate (13) has, on its side which faces the separating device (25; 55), a part (26; 54) which is inclined upward at an acute angle.

6. The support as claimed in claim 1, wherein the crossbeam (12) has, on its side which faces the separating device (25; 65), a (31) part which is inclined downward at an acute angle.

7. The support as claimed in claim 4, wherein the separating device (25; 55; 65) has a sharp-cornered edge (30) at its end which penetrates between the supporting plate and crossbeam.

8. The support as claimed in claim 1, wherein the crossbeam (12) and supporting plate (13) are connected to each other by welding points (14) or bolts (69), wherein the separating device (25; 65), by means of a wedging action, exerts a separating force (40) which tears open the closest welding points (14) or bolts (69).

9. The support as claimed in claim 1, wherein the crossbeam (12) and supporting plate (13) being connected to each other by bolts (69) or rivets, wherein the separating device (65) exerts a horizontal force which cuts through the closest bolts or rivets.

10. The support as claimed in claim 3, wherein the supporting plate (13) has, in order to form the separating device, a ramp (26) which is inclined upward at an acute angle, followed by a first bent-over section (27) whose end which faces the crossbeam (12) and the supporting plate (13) forms a separating edge (30).

11. The support as claimed in claim 10, wherein the ramp (26) of the supporting plate (13) has a stiffening bead (73) as far as the first bent-over section (27), and has lateral incisions (74) in the first bent-over section (27) and the following, a second bent-over section (29) extends over the entire width of the supporting plate (29).

12. The support as claimed in claim 11, wherein the second bent-over section (29) has reinforcing ribs (75) in the longitudinal direction.

* * * * *